United States Patent
Baran, Jr. et al.

(10) Patent No.: US 8,834,618 B2
(45) Date of Patent: Sep. 16, 2014

(54) METHOD OF INHIBITING WATER ADSORPTION OF POWDER BY ADDITION OF HYDROPHOBIC NANOPARTICLES

(75) Inventors: Jimmie R. Baran, Jr., Prescott, WI (US); Roxanne A. Boehmer, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 192 days.

(21) Appl. No.: 13/504,500

(22) PCT Filed: Nov. 29, 2010

(86) PCT No.: PCT/US2010/058149
§ 371 (c)(1),
(2), (4) Date: Apr. 27, 2012

(87) PCT Pub. No.: WO2011/068742
PCT Pub. Date: Jun. 9, 2011

(65) Prior Publication Data
US 2012/0233929 A1    Sep. 20, 2012

Related U.S. Application Data

(60) Provisional application No. 61/266,278, filed on Dec. 3, 2009.

(51) Int. Cl.
| | | |
|---|---|---|
| C09K 3/18 | (2006.01) | |
| C09C 1/00 | (2006.01) | |
| C09C 3/00 | (2006.01) | |
| B82Y 30/00 | (2011.01) | |
| C09C 3/12 | (2006.01) | |
| C09C 1/30 | (2006.01) | |

(52) U.S. Cl.
CPC ........... *C09C 1/3081* (2013.01); *C01P 2006/20* (2013.01); *B82Y 30/00* (2013.01); *C09C 3/12* (2013.01); *C01P 2006/22* (2013.01); *C01P 2006/11* (2013.01); *C01P 2004/64* (2013.01); *C01P 2006/12* (2013.01); *Y10S 977/773* (2013.01); *Y10S 977/775* (2013.01); *Y10S 977/776* (2013.01); *Y10S 977/777* (2013.01); *Y10S 977/902* (2013.01)
USPC ............... 106/2; 977/773; 977/775; 977/776; 977/777; 977/902

(58) Field of Classification Search
CPC .......... C09K 3/18; C09C 3/12; C09C 1/3081; B82Y 30/00; C01P 2004/64; C01P 2006/12; C01P 2006/20; C01P 2006/22
USPC ............... 106/2; 977/773, 775, 776, 777, 902
See application file for complete search history.

(56) References Cited

U.S. PATENT DOCUMENTS

| | | |
|---|---|---|
| 2,287,837 A | 6/1942 | Smyser |
| 2,447,347 A | 8/1948 | Smyser |
| 2,591,988 A | 4/1952 | Willcox |
| 3,333,776 A | 8/1967 | Rauner |
| 3,867,795 A | 2/1975 | Howard |
| 4,314,827 A | 2/1982 | Leitheiser |
| 4,518,397 A | 5/1985 | Leitheiser |
| 4,623,364 A | 11/1986 | Cottringer |
| 4,734,104 A | 3/1988 | Broberg |
| 4,737,163 A | 4/1988 | Larkey |
| 4,744,802 A | 5/1988 | Schwabel |
| 4,770,671 A | 9/1988 | Monroe |
| 4,881,951 A | 11/1989 | Monroe |
| 4,997,461 A | 3/1991 | Markhoff-Matheny |
| 5,009,675 A | 4/1991 | Kunz |
| 5,011,508 A | 4/1991 | Wald |
| 5,026,404 A | 6/1991 | Kunz |
| 5,042,991 A | 8/1991 | Kunz |
| 5,090,968 A | 2/1992 | Pellow |
| 5,139,978 A | 8/1992 | Wood |
| 5,168,082 A | 12/1992 | Matchett |
| 5,201,916 A | 4/1993 | Berg |
| 5,213,591 A | 5/1993 | Celikkaya |
| 5,227,104 A | 7/1993 | Bauer |
| 5,352,254 A | 10/1994 | Celikkaya |
| 5,366,523 A | 11/1994 | Rowenhorst |
| 5,429,647 A | 7/1995 | Larmie |
| 5,498,269 A | 3/1996 | Larmie |
| 5,551,963 A | 9/1996 | Larmie |
| 5,556,437 A | 9/1996 | Lee |
| 5,849,052 A | 12/1998 | Barber |
| 6,037,019 A | 3/2000 | Kooyer |
| 6,758,734 B2 | 7/2004 | Braunschweig |
| 7,001,580 B2 | 2/2006 | Baran, Jr. |
| 7,381,466 B2 | 6/2008 | Zeiringer |

(Continued)

FOREIGN PATENT DOCUMENTS

| | | |
|---|---|---|
| CN | 1785880 | 6/2006 |
| EP | 1245644 | 10/2002 |
| WO | WO 2007/019229 | 2/2007 |
| WO | WO 2008/079650 | 7/2008 |
| WO | WO 2009/085926 | 7/2009 |
| WO | WO 2009/118381 | 10/2009 |
| WO | WO 2010/074862 | 7/2010 |
| WO | WO 2010/151435 | 12/2010 |
| WO | WO 2011/068678 | 6/2011 |

OTHER PUBLICATIONS

Brunauer et al., "Adsorption of Gases in Multimolecular Layers", J. Am. Chem. Soc. Feb. 1938, vol. 60, p. 309-319.

(Continued)

*Primary Examiner* — Anthony J Green
(74) *Attorney, Agent, or Firm* — Carolyn A. Fischer

(57) ABSTRACT

Presently described are methods of inhibiting water vapor adsorption of a powder and methods of storing a powder at increased humidity level. The methods comprise providing adding discrete hydrophobic nanoparticles to a plurality of particles.

20 Claims, No Drawings

(56) References Cited

U.S. PATENT DOCUMENTS

| | | |
|---|---|---|
| 2001/0049911 A1 | 12/2001 | Swei |
| 2005/0124749 A1 | 6/2005 | Scachtely |
| 2008/0166558 A1 | 7/2008 | Baran, Jr. |
| 2008/0286362 A1 | 11/2008 | Baran Jr. |
| 2009/0081304 A1 | 3/2009 | Choy |
| 2010/0044478 A1 | 2/2010 | Yen |

OTHER PUBLICATIONS

Abdelwahed et al., "Freeze-drying of nanocapsules: Impact of annealing on the drying process", International Journal of Pharmaceutics, vol. 324, No. 1, Oct. 31, 2006, pp. 74-82.

PCT/US2010/058149, International Search Report, Apr. 6, 2011, 4 pgs.

Son et al. Nov. 2010. *Pharmaceutical Technology Europe.* 5 pages. "Dissolution testing for inhaled drugs".

US 8,834,618 B2

METHOD OF INHIBITING WATER ADSORPTION OF POWDER BY ADDITION OF HYDROPHOBIC NANOPARTICLES

CROSS REFERENCE TO RELATED APPLICATIONS

This application is a national stage filing under 35 U.S.C. 371 of PCT/US2010/058149, filed Nov. 29, 2010, which claims priority to U.S. Provisional Application Ser. No. 61/266,278, filed Dec. 3, 2009, the disclosure of which is incorporated by reference in their entirety herein.

BACKGROUND

WO 2008/079650 and WO 2007/019229 describe adding nanoparticles to particles for the purpose of improving the flow properties.

SUMMARY

It has been found that the hydrophobicity of a larger particle size powder can be increased by combining such powder with hydrophobic nanoparticles, such as metal oxide nanoparticles having a hydrophobic surface treatment. The presence of such nanoparticles can inhibit the amount of water adsorbed onto the larger particle size powder. Reduced water adsorption results in the ability to handle the powder in a more consistent manner over time and in different humidity environments. Controlling the water adsorption is also important for imparting an electrostatic charge on a powder.

In one embodiment, a method of inhibiting water vapor adsorption of a powder is described. The method comprises providing a plurality of particles; adding discrete hydrophobic nanoparticles; and exposing the particles to a relative humidity of least 15%.

In another embodiment, a method of storing a powder is described. The method comprises providing a powder comprising plurality of particles and discrete hydrophobic nanoparticles; and storing the powder at a relative humidity of at least 15%.

The particles combined with the hydrophobic surface modified nanoparticles have a lower water vapor adsorption than the plurality of particles alone. The (e.g. gross) water adsorption can be reduced by at least 20%, 30%, 40%, 50%, or greater. The methods described herein are particularly useful for powders having a relatively small particle size. As the particle size of the larger particles decreases, the addition of the nanoparticles can dramatically increase the total surface area. In such embodiments, the water adsorption per surface area can be reduced by at least 20%, 30%, 40%, 50%, or greater. In some embodiments, the packing density is increased and/or the total energy of powder flow is reduced.

DETAILED DESCRIPTION

Presently described are methods of inhibiting water vapor adsorption of a powder and methods of storing a powder at increased humidity level.

The particles may be distinguished from the nanoparticles by relative size. The particles are larger than the nanoparticles.

Typically, the nanoparticles have an average primary or agglomerate particle size diameter of less than 100 nanometers. "Agglomerate" refers to a weak association between primary particles which may be held together by charge or polarity and can be broken down into smaller entities. "Primary particle size" refers to the mean diameter of a single (non-aggregate, non-agglomerate) particle. In some embodiments, the nanoparticles have an average particle size of no greater than 75 nanometers or 50 nanometers. The nanoparticles typically have an average primary or agglomerate particle size diameter of at least 3 nanometers. In some preferred embodiments, the average primary or agglomerate particle size is less than 20 nm, 15 nm, or 10 nm. Nanoparticle measurements can be based on transmission electron microscopy (TEM).

Unlike fumed silica that comprises silica aggregates, the nanoparticles utilized herein comprise a sufficient concentration of discrete unaggregated nanoparticles. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e. at least 50%) are present as discrete unagglomerated nanoparticles. For example, at least 70%, 80% or 90% of the nanoparticles are present as discrete unagglomerated nanoparticles.

The particles have a median primary or agglomerate particle size (generally measured as an effective diameter) of at least 100 nm (i.e. 0.1 microns), 200 nm, 300 nm, 400 nm, or 500 nm. The median particle size is typically no greater than about 1,000 micrometers and more typically no greater than 500, 400, 300, or 200 micrometers. In some embodiments, the particles have a polymodal (e.g., bi-modal or tri-modal) distribution.

Without intending to be bound by theory, the effect of inhibiting water adsorption tends to increase with decreasing median particle size. Hence, in favored embodiments, the particle size, i.e. of the larger particles, is no greater than 75 microns, 50 microns, or microns. In some embodiments, the particles have a median particle size of no greater than 20 microns, 15 microns, or 10 microns.

The larger (e.g. abrasive grain) particles typically have a median primary particle size of at least 50, 60, 70, 80, 90, or 100 times larger than the mean particle size of the nanoparticles. In some embodiments, the larger (e.g. abrasive grain) particles have a median primary particle size of at least 200, 300, 400, 500, 600, 700, 800 times larger than the mean particle size of the nanoparticles. The larger (e.g. abrasive grain) particles may have a median primary particle size up to 5,000 or 10,000 times larger than the mean particle size of the nanoparticles.

A variety of inorganic or organic nanoparticles can be used to practice the methods of inhibiting water vapor adsorption, as described herein.

Exemplary inorganic nanoparticle materials include for example metal phosphates, sulfonates and carbonates (e.g., calcium carbonate, calcium phosphate, hydroxy-apatite); metal oxides (e.g., zirconia, titania, silica, ceria, alumina, iron oxide, vanadia, zinc oxide, antimony oxide, tin oxide, and alumina-silica), and metals (e.g., gold, silver, or other precious metals).

The nanoparticles are typically substantially spherical in shape. However, other shapes such as elongated shapes may alternatively be employed. For elongated shapes, an aspect ratios less than or equal to 10 is typical, with aspect ratios less than or equal to 3 more typical.

In some embodiments, the nanoparticles may comprise an organic material. Specific examples of useful organic materials include (e.g. alkylated) buckminsterfullerenes (fullerenes) and (e.g. alkylated) polyamidoamine (PAMAM) dendrimers. Specific examples of fullerenes include $C_{60}$, $C_{70}$, $C_{82}$, and $C_{84}$. Specific examples of PAMAM dendrimers include those of Generations 2 through 10 (G2 G10), available from Aldrich Chemical Company, Milwaukee, Wis. PAMAM dendrimers are currently commercially available with $C_{12}$ surface functional groups. The alkyl groups on the organic molecules may be straight or branched and may range from at least $C_3$ to not greater than $C_{30}$ and may be any size or range in between $C_3$ and $C_{30}$. For example, the ranges may be $C_3$ to $C_{22}$; $C_3$ to $C_{18}$; $C_3$ to $C_{12}$; or $C_3$ to $C_8$, and any combination or integer therebetween. The surface-modified organic molecules may be present in a continuous phase of an emulsion at a level of from at least 0.1 percent by weight, such as described in U.S. Pat. No. 7,001,580.

Specific examples of organic polymeric microspheres include microspheres that comprise polystyrene, available from Bangs Laboratories, Inc., Fishers, Ind., as powders or dispersions. Average particle sizes of the polystyrene microspheres range from at least 20 nm to not more than 60 nm. Current commercially available average particle sizes are 20, 30, 50, and 60 nm.

When the nanoparticle is comprised of an organic material, the nanoparticle may be sufficiently hydrophobic in the absence of a surface treatment in view of the hydrophobic nature of the organic material.

In some embodiments the nanoparticles preferably comprise an inorganic material such as a metal oxide. Various nanoparticles are commercially available. In some embodiments, the nanoparticles comprise silica, zirconia, or a mixture thereof. Commercial sources of silica nanoparticles are available from Nalco Co, Napervillle, Ill. Nanoparticles can also be made using techniques known in the art. For example, zirconia nanoparticle can be prepared using hydrothermal technology, as described for example in WO2009/085926.

In some embodiments, the (e.g. non-surface modified) nanoparticles may be in the form of a colloidal dispersion. For example, colloidal silica dispersions are available from Nalco Co. under the trade designations "NALCO 1040," "NALCO 1050," "NALCO 1060," "NALCO 2327," and "NALCO 2329". Zirconia nanoparticle dispersions are available from Nalco Chemical Co. under the trade designation "NALCO OOSSOO8" and from Buhler AG Uzwil, Switzerland under the trade designation "Buhler zirconia Z-WO". Some colloidal dispersions, especially of surface modified nanoparticles, can be dried to provide nanoparticles for dry milling processes.

The nanoparticles may be fully condensed. Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The inorganic (e.g. metal oxide) nanoparticles are generally hydrophilic in nature. The nanoparticles are rendered hydrophobic upon being surface modified with a hydrophobic surface treatment.

Surface modification involves attaching surface modification agents to inorganic oxide particles to modify the surface characteristics. In general, a surface treatment has a first end that will attach to the nanoparticle surface (covalently, ionically or through strong physisorption) and a second end that imparts steric stabilization that prevents the particles from agglomerating such as permanently fusing together. The inclusion of surface modification can also improve the compatibility of the particles with other materials. For example, an organic end group such as the organic group of an organosilane can improve the compatibility of the particles with organic matrix material such as polymerizable and thermoplastic resins.

Examples of surface treatment agents include alcohols, amines, carboxylic acids, sulfonic acids, phosphonic acids, silanes and titanates. The preferred type of treatment agent is determined, in part, by the chemical nature of the (e.g. metal oxide) nanoparticle surface. Silanes are preferred for silica and for other siliceous fillers. Silanes and carboxylic acids are preferred for metal oxides such as zirconia. When an organosilane surface treatment is applied to metal oxide nanoparticles, the silane end is generally adsorbed by the nanoparticle. When a carboxylic acid is applied to a zirconia nanoparticle, the acid end is generally adsorbed by the zirconia. Exemplary silanes (e.g. organosilanes) include, but are not limited to, alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acyrloxyalkyldialkylalkoxysilanes such as 3-(methacryloxy)propyldimethylethoxysilane; mercaptoalkyltrialkoxylsilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris(isobutoxy)silane, vinyltriisopropenoxysilane, and vinyltris(2-methoxyethoxy)silane; and combinations thereof.

In favored embodiments, the nanoparticles are rendered hydrophobic by surface treatment with an organosilane, wherein the organosilane comprises an alkyl group. The alkyl group preferably comprises at least four or five carbon atoms. Such alkyl group may be branched or cyclic, yet is typically a straight-chained alkyl group. As the chain length of the alkyl group increases, the hydrophobicity typically increases. In some favored embodiments, the alkyl group comprises at least 6, 7, or 8 carbon atoms. The alkyl group typically comprises no greater than twenty-six carbon atoms. Non-limiting examples of alkyl groups include butyl, iso-butyl, sec-butyl, pentyl, iso-pentyl, neo-pentyl, hexyl, 2-ethylhexyl, octyl, decyl, undecyl, dodecyl, tetradecyl, pentadecyl, octadecyl, cyclohexyl, 4-methylcyclohexyl, cyclohexylmethyl, cyclopenyl, and cyclooctyl. The alkyl group may optionally comprise other substituents. In some embodiments, such substituents may be hydrophobic substituents. However, hydrophilic substituents may optionally be present, provided that the alkyl silane is sufficiently hydrophobic such that the water adsorption (e.g. water adsorption/BET surface area) is reduced.

Carboxylic acid surface modifying agents may comprise the reaction product of phthalic anhydride with an organic compound having a hydroxyl group. Suitable examples include, for example, phthalic acid mono-(2-phenylsulfanyl-ethyl)ester, phthalic acid mono-(2-phenoxy-ethyl)ester, or phthalic acid mono-[2-(2-methoxy-ethoxy)-ethyl]ester. In some examples, the organic compound having a hydroxyl group is a hydroxyl alkyl(meth)acrylate such as hydroxyethyl (meth)acrylate, hydroxypropyl(meth)acrylate, or hydroxylbutyl(meth)acrylate. Examples include, but are not limited to, succinic acid mono-(2-acryloyloxy-ethyl)ester, maleic acid mono-(2-acryloyloxy-ethyl)ester, glutaric acid mono-(2-acryloyloxy-ethyl)ester, phthalic acid mono-(2-acryloyloxy-ethyl)ester, and phthalic acid mono-(2-acryloyl-butyl)ester. Still others include mono-(meth)acryloxy polyethylene glycol succinate and the analogous materials made from maleic anhydride glutaric anhydride, and phthalic anhydride.

In another example, the surface modification agent is the reaction product of polycaprolactone and succinic anhydride such as described in WO2010/074862.

Various other surface treatments are known in the art, such as described in WO2007/019229; incorporated herein by reference.

The surface treatment may comprise a blend of two or more hydrophobic surface treatments. For example, the surface treatment may comprise at least one surface treatment having a relatively long substituted or unsubstituted hydrocarbon group. In some embodiments, the surface treatment comprises at least one hydrocarbon group having at least 6 or 8 carbon atoms, such as isooctyltrimethoxy silane, with a second surface treatment that is less hydrophobic, such as methyl trimethoxy silane.

The surface treatment may also comprise a blend of a hydrophobic surface treatment and (e.g. a small concentration of) a hydrophilic surface treatment, provided that the inclusion of such does not detract from the inhibition of water adsorption as contributed by the hydrophobic surface treatment(s).

The nanoparticles are typically combined with the surface modification prior to mixing the nanoparticle with the particles. The amount of surface modifier is dependant upon several factors such as nanoparticle size, nanoparticle type, molecular weight of the surface modifier, and modifier type. In general, it is preferred that approximately a monolayer of modifier is attached to the surface of the nanoparticle. The attachment procedure or reaction conditions also depend on the surface modifier used. For silanes it is preferred to surface treat at elevated temperatures under acidic or basic conditions for about 1-24 hour. Surface treatment agents such as carboxylic acids do not require elevated temperatures or extended time.

The surface modification of the nanoparticles in the colloidal dispersion can be accomplished in a variety of ways. The process involves the mixture of an inorganic dispersion with surface modifying agents. Optionally, a co-solvent can be added at this point, such as for example, 1-methoxy-2-propanol, methanol, ethanol, isopropanol, ethylene glycol, N,N-dimethylacetamide, 1-methyl-2-pyrrolidinone, and mixtures thereof. The co-solvent can enhance the solubility of the surface modifying agents as well as the dispersibility of the surface modified nanoparticles. The mixture comprising the inorganic sol and surface modifying agents is subsequently reacted at room or an elevated temperature, with or without mixing.

The particles may include organic particles, inorganic particles, and combinations thereof.

Although the particles may also comprise any of the same inorganic materials previously discussed with respect to the nanoparticles, the particles and nanoparticles typically comprise different materials.

Additional exemplary inorganic particles include abrasives, ceramics (including beads, and microspheres), additives such an inorganic pigments, exfolients, cosmetic ingredients, and various fillers such as silicates (e.g., talc, clay, mica, and sericite), calcium carbonate, nepheline (available, for example, under the trade designation "MINEX" from Unimin Corp, New Canaan, Conn.), feldspar and wollastonite.

Exemplary ceramics include aluminates, titanates, zirconates, silicates, doped (e.g., lanthanides, and actinide) versions thereof, and combinations thereof. Ceramic microspheres are marketed, for example, by 3M Company under the trade designation "3M CERAMIC MICROSPHERES" (e.g., grades G-200, G-400, G-600, G-800, G-850, W-210, W-410, and W-610).

The particles may also be inorganic pigment particles. Inorganic pigments include titania, carbon black, Prussian Blue, iron oxide, zinc oxide, zinc ferrite and chromium oxide.

The particles may comprise organic particles including for example polymers, waxes, flame retardants, medicaments, pigments, additives, foodstuffs (e.g. coffee, milled grains), toner materials, pharmaceuticals, and excipients (i.e. an inactive substance used as a carrier for the active ingredient of a medication).

Medicaments include antiallergics, analgesics, bronchodilators, antihistamines, therapeutic proteins and peptides, antitussives, anginal preparations, antibiotics, anti-inflammatory preparations, diuretics, hormones, or sulfonamides, such as, for example, a vasoconstrictive amine, an enzyme, an alkaloid or a steroid, and combinations of any one or more of these. Various medicaments are known in the art such as described in WO 2007/019229; incorporated herein by reference.

Common excipients include dry and solution binders that are added to a (e.g. powder blend), either after a wet granulation step, or as part of a direct powder compression (DC) formula. Examples include gelatin, cellulose and derivatives thereof, starch polyvinylpyrrolidone, sucrose, lactose, lactose monohydrate and other sugars; and polyethylene glycol. Another class of excipients are sugar alcohols and other non-nutritive sweeteners.

Exemplary polymers include poly(vinyl chloride), polyester, poly(ethylene terephthalate), polypropylene, polyethylene, poly vinyl alcohol, epoxies, polyurethanes, polyacrylates, polymethacrylates, and polystyrene.

The particles may also comprise organic pigments. Exemplary classes of organic pigments include phthalocyanine, diarylamide, pyrazolone, isoindolinone, isoinoline, carbazole, anthraquinone, perylene and anthrapyrimidine.

A minor amount of nanoparticles is generally combined with a major amount of particles to form a mixture. The mixture can optionally be milled such that the milled particles have a reduced particle size as described in U.S. patent application Ser. No. 61/220,698, filed Jun. 26, 2009.

In many embodiments, the hydrophobic (e.g. surface modified) nanoparticles will be present in an amount no greater than 10 weight percent solids of the total particle mixture of particles and nanoparticles. In some embodiments, the hydrophobic nanoparticles are present in an amount no greater than about 5, 4, 3, 2 weight percent solids. The amount of hydrophobic nanoparticles is typically at least 0.01 wt-%, 0.05 wt-%, or 0.10 wt-% solids. In some embodiments, the amount of hydrophobic nanoparticles is at least 0.20 wt-% solids, 0.30 wt-% solids, 0.40 wt-% solids, or 0.50 wt-% solids. However, if the particles are a concentrated master batch, the concentration of hydrophobic nanoparticles may be substantially higher.

In some embodiments, the method comprises providing a mixture comprising a plurality of particles, and (i.e. dry) surface-modified nanoparticles.

In other embodiments, the method comprises providing a mixture comprising a plurality of particles, a volatile inert liquid that is not a solvent (i.e. with respect to the larger particles), and a nanoparticle-containing colloidal dispersion. Typical liquids that may be employed include, for example, toluene, isopropanol, heptane, hexane, octane, and water. The amount of liquid is sufficiently small such that the liquid evaporates during mixing. The concentration of liquid in the mixture is less than 5 wt-%. In some embodiments, the amount of liquid is no greater 4, 3, 2, 1, or 0.5 wt-%. If a higher concentration of liquid is employed, the method then typically further comprises removing the liquid, for example by filtering and/or evaporation to recover a free-flowing dry powder.

The inclusion of the nanoparticles can provide various beneficial properties to the resulting free-flowing powder and in particular lower water adsorption, particularly at increased humidity levels such as a relative humidity of at least 25%, 50%, 75%, or 90%. In some embodiments, the gross water adsorption is reduced by 10 wt-%, 20 wt-%, 30 wt-%, 40 wt-%, 50 wt-%, 60 wt-% or greater.

As the particle size of a powder decreases, the surface area typically decreases. However, as the particle size of a powder decreases, the tendency to form agglomerations can also increase. This tendency to form agglomerations can offset any benefits obtained by increasing the surface area. Typically additives do not significantly increase the surface area. However, the addition of discrete hydrophobic nanoparticles can dramatically increase the total surface area. For example, the addition of 1 wt-% (e.g. 5 nm) nanoparticles can increase the total surface area by a factor of 50 or greater. In such embodiments, the gross water adsorption may not be reduced. However, the water adsorption as a function of total surface area (i.e. of the particles and nanoparticles combined) is reduced. The water adsorption per surface area can be reduced by at least 10%, 20%, 30%, 40%, 50%, 60%, 70%, 80%, 90%, 100% or greater. Water adsorption per surface area is surmised important for electrostatic coating, rate of drying, and total energy of powder flow.

In one favored embodiment, the milled particles have a higher packing density (i.e. relative to the same particles milled in the absence of nanoparticles). For example, the packing density can increase by 0.2, 0.4, 0.6, 0.8, 1.0 or 1.2 g/cc. An increase in packing density of even 5 or 10% can be particularly beneficial for reducing the volume of powdered materials for shipping. In some embodiments, the packing density was increased by at least 20% relative to the same particles milled in the absence of nanoparticles and by as much as 50%, 60% or greater relative to post addition of (e.g. surface modified) nanoparticles.

In another favored embodiment, the milled particles exhibit a lower total energy of powder flow (i.e. relative to the same particles milled in the absence of nanoparticles). This equates to less energy expenditure for handing (e.g. conveying and mixing) powdered materials. It has been found that the inclusion of nanoparticles can lower the total energy of powder flow by 5%, 10%, 20%, 30%, 40%, 50%, 60%, or greater.

The free-flowing powder can exhibit any one or combination of improved properties as just described. In a favored embodiment, the free-flowing powder exhibits a combination of lower water adsorption, increased packing density, and a lower total energy of powder flow.

Various modifications and alterations of this invention will be apparent to those skilled in the art without departing from the scope and spirit of this invention, and it should be understood that this invention is not limited to the illustrative embodiments set forth herein.

EXAMPLES

These examples are for illustrative purposes only and are not meant to be limiting on the scope of the appended claims. All parts, percentages, and ratios in the examples and the rest of the specification are based on weight, unless noted otherwise. Solvents and other reagents used were obtained from Sigma-Aldrich Chemical Company (Milwaukee, Wis.) unless otherwise noted.

Particles Employed in the Examples 5 micron spheriodized talc (available from 3M Company under the trade designation "CM-111")

10 micron $CaCO_3$ (Sigma-Aldrich)

42 micron lactose monohydrate was obtained from Alfa Aesar Company (Ward Hill, Mass.)

325 mesh aluminum powder having a particle size of less than 45 microns from Alfa Aesar Company Cab-O-Sil TS-530 is fumed silica obtained from Cabot Corporation (Billerica, Mass.) having an agglomerate size of 325US mesh (44 microns).

Nanoparticles Employed in the Examples

Preparation of Hydrophobic Surface Modified 5 nm Silica Nanoparticles 100 g of NALCO 2326 (16.6% solids in water from Nalco Company, Naperville, Ill.) was measured into a 3-neck round-bottom flask (Ace Glass, Vineland, N.J.). A glass stirring rod with a Teflon paddle was attached to the center neck of the round-bottom flask. The flask was lowered into the oil bath, a condenser was attached, and then the contents were allowed to stir at a medium-high rate. 112.5 g of an 80:20 mixture of ethanol (EMD, Gibbstown, N.J.) and methanol (VWR, West Chester, Pa.) was prepared in a 250 mL glass beaker. In a 150 mL beaker, the following components were measured in the following order: half of the 80:20 ethanol:methanol mixture, 7.54 g of isooctyltrimethoxy silane (IOTMS, Gelest, Morrisville, Pa.) and 0.81 g of methyltrimethoxy silane (Sigma-Aldrich Corp., St. Louis, Mo.) The solution was mixed thoroughly and then added to the 3-neck round-bottom flask containing the Nalco 2326 material. The remaining half of the 80:20 ethanol:methanol was used to rinse any leftover silane from the 150 mL beaker into the reaction. The reaction was allowed to stir for 4 hours in an oil bath set at 80° C. The surface modified nanoparticles were transferred to a crystallizing dish and dried in an oven set at 150° C. for approximately 1.5 hours. The dried, white product was manually ground up using a mortar and pestle or coffee grinder and transferred to a glass jar.

Preparation of Surface Modified 20 nm Nanoparticles (SM 20 nm $SiO_2$)

The procedure followed was the same except that 100 g NALCO 2327 (41.45%), and 4.02 g IOTMS and 112.5 g 1-methoxy-propanol were used.

Water Adsorption Testing

A 30.5 cm×30.5 cm glass chamber equipped with a glass lid was used to create a constant relative humidity environment. Chemical salts in a water slurry were used to control the relative humidity (Rh). Lithium chloride was used to create 18% Rh, magnesuim nitrate to create 55% Rh, potassium chloride to create 80% Rh, and potassium sulfate to create 95% Rh. The salt was made into a slushy type solution in a glass dish and placed in one corner inside the glass chamber. An electronic therm/hygrometer (VWR) was placed in the chamber to monitor the Rh. The chamber was allowed to equilibrate for 2 days at Rh, before introducing the samples.

The (i.e. larger particle size) powders were first combined with the nanoparticles in the noted amount and mixed together using a FlackTek Speedmixer™ DAC 150FVZ (Landrum, S.C., USA), for 1 minute at 3000 RPM. The powders were then mixed by hand with a wooden stick and then remixed for 1 minute at 3000 RPM on the Speedmixer again. The mixture was then placed in glass or aluminum dishes, dried in a 80° C. oven for 6 days and then in turn were placed in the above described chamber. They were then allowed to equilibrate for six to seven days before determining water adsorption.

Water adsorption was determined by Karl Fischer analysis using a Metrohm 756 Coulomat® with Aquastar® A and Aquastar® C reagents. Each sample was run in duplicate. Approximately 1 g samples were weighed into dry glass vials to an accuracy of +/−0.0001 g. The samples were then treated with 10 mL of anhydrous methanol and re-weighed. The vials were then shaken for 24 hours to extract the moisture from the samples. The vials were then placed in a centrifuge to separate the solids and then aliquots were drawn using polypropylene syringes equipped with 22-guage needles. The aliquots were then submitted to the Karl Fischer titration. Three aliquots were drawn from each vial to give a total of six titrations for each sample. Methanol blanks were also run to determine the background level of water in the solvent.

Powder Rheology and Packing Density Measurements

Powder rheology and packing density data were acquired using a Freeman FT4 powder rheometer (Freeman Technologies, Ltd., Worcestershire, UK) and the Repeatability/Variability test module, as received from the manufacturer. The Total Energy of Powder Flow reported is the value from the seventh test in the procedure at which point the test powder has reaches equilibrium.

BET Surface Area

The surface area of the particles in combination with the nanoparticles was calculated as described by Brunauer, Emmet & Teller (J. Am. Chem. Soc. 1938, vol. 60, pg. 309).

The water adsorption and packing density of $CaCO_3$ particles was evaluated using the hydrophobic surface modified 5 nm silica nanoparticles described above.

TABLE 1A

| | $CaCO_3$ Weight (g) (% Gross Change in Water Adsorption) | | |
|---|---|---|---|
| Wt-% Hydrophobic 5 nm Nanoparticles | 95% RH | 53% RH | 17% RH |
| Control - no nanoparticles | 0.019 g | 0.019 g | 0.012 g |
| Example 1 0.01% | 0.010 g (−47%) | — | — |
| Example 2 0.05% | 0.017 g (−11%) | — | — |
| Example 3 0.1% | 0.026 g (+37%) | 0.032 g (+68%) | 0.021 g (+75%) |
| Example 4 0.5% | 0.042 g (+121%) | 0.041 g (+116%) | 0.027 g (+125%) |
| Example 5 1.0% | 0.047 g (+147%) | 0.050 g (+163%) | 0.035 g (+192%) |

The results show that the addition of 0.01% and 0.05% hydrophobic nanoparticles to the $CaCO_3$ particles exhibited a reduction in gross water adsorption at 95% RH; whereas the additions of 0.1% and greater exhibited an increased gross water adsorption.

TABLE 1B

| | $CaCO_3$ Packing Density (% Change) | | | |
|---|---|---|---|---|
| Wt-% Hydrophobic 5 nm Nanoparticles | 17% RH | 53% RH | 95% RH | 80% RH |
| Control - no nanoparticles | 0.732 g/ml | 0.773 g/ml | 0.670 g/ml | 0.732 g/ml |
| Example 1 0.01% | — | — | 0.904 g/ml (+25%) | — |
| Example 2 0.05% | — | — | 0.985 g/ml (+47%) | — |
| Example 3 0.1% | 0.909 g/ml (+9.1%) | 0.958 g/ml (+4.2%) | 0.951 g/ml (+42%) | 0.962 g/ml (+31%) |
| Example 4 0.5% | 1.007 g/ml (+38%) | 1.004 g/ml (+30%) | 1.000 g/ml (+49%) | 1.099 g/ml (+50%) |
| Example 5 1.0% | 0.927 g/ml (+27) | 0.939 g/ml (+21%) | 0.941 g/ml (+40%) | 0.937 g/ml (+28%) |

The results show that the addition of hydrophobic nanoparticles to the $CaCO_3$ particles exhibited an increased packing density.

The data of Table 1A was then divided by BET surface area to take into account the change in surface area.

TABLE 1C

| | $CaCO_3$ Water Adsorption/BET Surface Area (% Change in Water Adsorption/BET Surface Area) | | | |
|---|---|---|---|---|
| Wt-% Hydrophobic 5 nm Nanoparticles | BET Surface Area $m^2/g$ (Change in BET Surface Area) | 95% RH | 53% RH | 17% RH |
| Control - no nanoparticles | 0.0428 $m^2/g$ | 0.408 g | 0.408 g | 0.258 g |
| Example 1 0.01% | 0.0404 $m^2/g$ (−5.6%) | 0.248 g (−39%) | — | — |
| Example 2 0.05% | 0.0855 $m^2/g$ (+100%) | 0.199 g (−51%) | — | — |
| Example 3 0.10% | 0.1437 $m^2/g$ (+236%) | 0.202 g (−50%) | 0.248 g (−39%) | 0.163 g (−37%) |
| Example 4 0.50% | 1.0341 $m^2/g$ (+2316%) | 0.043 g (−89%) | 0.042 g (−90%) | 0.027 g (−90%) |
| Example 5 1.00% | 2.3058 $m^2/g$ (+5287%) | 0.020 g (−95%) | 0.022 g (−95%) | 0.015 g (−94%) |
| Example 6 2.00% | — | 0.022 g (−95%) | — | — |

The results show that the addition of hydrophobic nanoparticles to the $CaCO_3$ particles exhibited a substantial increase in BET surface area and exhibited a decrease in water adsorption/BET surface area at all three humidity levels.

The $CaCO_3$ particles were also evaluated using the 20 nm hydrophobic surface treated silica nanoparticles described above.

TABLE 2A

CaCO$_3$ Weight (g)
(% Gross Change in Water Adsorption)

| Wt-% Hydrophobic 20 nm Nanoparticles | 95% RH | 53% RH | 17% RH |
|---|---|---|---|
| Control - no nanoparticles | 0.046 g | 0.011 g | 0.013 g |
| Example 7 - 0.1% | 0.038 g (−17%) | 0.025 g (+127%) | 0.024 g (+85%) |
| Example 8 - 0.5% | 0.053 g (+15%) | 0.038 g (+245%) | 0.038 g (+192%) |
| Example 9 - 1.0% | 0.060 g (+30%) | 0.038 g (+245) | 0.047 g (262%) |

The results show that the addition of 0.01% hydrophobic nanoparticles to the CaCO$_3$ particles exhibited a reduction in gross water absorption at 95% RH; whereas the additions of 0.1% at 53% RH and 17% RH and concentrations of 0.5% and greater exhibited an increase in gross water adsorption.

The data of Table 2A was then divided by BET surface area to take into account the change in surface area.

TABLE 2B

CaCO$_3$ Water Adsorption/BET Surface Area
(% Change in Water Adsorption/BET Surface Area)

| Wt-% Hydrophobic 20 nm Nanoparticles | BET Surface Area m$^2$/g (Change in Surface Area) | 95% RH | 53% RH | 17% RH |
|---|---|---|---|---|
| Control - no nanoparticles | 0.301 m$^2$/g | 0.153 g | 0.037 g | 0.043 g |
| Example 7 0.10% | 0.256 m$^2$/g (−15%) | 0.148 g (−3.4%) | 0.098 g (+1.65%) | 0.094 g (+118%) |
| Example 8 0.50% | 0.583 m$^2$/g (+94%) | 0.091 g (−41%) | 0.065 g (+76%) | 0.065 g (+34%) |
| Example 9 1.00% | 0.936 m$^2$/g (+211%) | 0.064 g (−58%) | 0.041 g (+11%) | 0.050 g (+16%) |

The results show that the addition of hydrophobic nanoparticles to the CaCO$_3$ particles exhibited a decrease in water adsorption/BET surface area at 95% RH; but increase the water adsorption/BET surface area at 53% RH and 17% RH. Since the smaller nanoparticles decreased the water adsorption/BET surface area at all three humidity levels, the smaller nanoparticles can be preferred for reducing water adsorption.

TABLE 3A

Talc Weight (g)
(% Gross Change in Water Adsorption)

| Wt-% Hydrophobic 5 nm Nanoparticles | 95% RH | 53% RH | 17% RH |
|---|---|---|---|
| Control - no nanoparticles | 0.315 g | 0.348 g | 0.136 g |
| Example 10 0.1% | 0.218 g (−31%) | 0.178 g (−49%) | 0.102 g (−25%) |
| Example 11 0.5% | 0.188 g (−28%) | 0.130 g (−63%) | 0.102 g (−25%) |
| Example 12 1.0% | 0.190 g (−40%) | 0.142 g (−59%) | 0.105 g (−23%) |

The results show that the addition of hydrophobic nanoparticles to talc exhibited a reduction in the gross water absorption.

TABLE 3B

Talc Packing Density
(% Change in Packing Density)

| Wt-% Hydrophobic 5 nm Nanoparticles | 17% RH | 53% RH | 80% RH | 95% RH |
|---|---|---|---|---|
| Control - no nanoparticles | 0.714 g/ml | 0.560 g/ml | 0.532 g/ml | 0.485 g/ml |
| Example 10 0.1% | 0.860 g/ml (+20%) | 0.794 g/ml (+29%) | 0.688 g/ml (+29%) | 0.562 g/ml (+16%) |
| Example 11 0.5% | 1.001 g/ml (+40%) | 0.992 g/ml (+77%) | 0.975 g/ml (+83%) | 0.942 g/ml (+94%) |
| Example 12 1.0% | 1.020 g/ml (+43%) | 1.017 g/ml (+82%) | 1.020 g/ml (+92%) | 1.000 g/ml (+106%) |

The results show that the addition of hydrophobic nanoparticles to talc exhibited an increase in packing density.

The data of Table 3A was then divided by BET surface area to take into account the change in surface area.

TABLE 3C

Talc Water Adsorption/BET Surface Area
(% Change in Water Adsorption/BET Surface Area)

| Wt-% Hydrophobic 5 nm Nanoparticles | BET Surface Area m$^2$/g (Change in Surface Area) | 95% RH | 53% RH | 17% RH |
|---|---|---|---|---|
| Control - no nanoparticles | 1.760 m$^2$/g | 0.179 g | 0.198 g | 0.077 g |
| Example 10 0.10% | 1.857 m$^2$/g (+5.5%) | 0.117 g (−35%) | 0.096 g (−52%) | 0.055 g (−29%) |
| Example 11 0.50% | 3.056 m$^2$/g +74% | 0.062 g (−65%) | 0.043 g (−78%) | 0.033 g (−57%) |
| Example 12 1.00% | 4.127 m$^2$/g 134% | 0.046 g (−74%) | 0.034 g (−83%) | 0.025 g (−68%) |

The results show that the addition of hydrophobic nanoparticles to talc exhibited an increase in BET surface area and exhibited a decrease in water adsorption/BET surface area.

TABLE 4A

Lactose Weight (g)
(% Gross Change in Water Adsorption)

| Wt-% Hydrophobic 5 nm Nanoparticles | 95% RH | 53% RH | 17% RH |
|---|---|---|---|
| Control - no nanoparticles | 5.074 | 4.837 | 4.921 |
| Example 13 0.1% | 5.016 (−1.1%) | 4.905 (+1.4%) | 5.040 (+2.4%) |
| Example 14 0.5% | 5.030 (<1%) | 4.928 (+1.9%) | 4.943 (<1%) |
| Example 15 1.0% | 4.981 (−1.8%) | 4.884 (<1%) | 5.023 (+2.1%) |

The results show that the addition of the hydrophobic nanoparticles to lactose exhibited about the same gross water adsorption.

TABLE 4B

Lactose Packing Density (g/ml)
(% Change in Packing Density)

| Wt-% Hydrophobic 5 nm Nanoparticles | 17% RH | 53% RH | 80% RH | 95% RH |
|---|---|---|---|---|
| Control - no nanoparticles | 0.638 | 0.569 | 0.523 | 0.486 |
| Example 13 0.1% | 0.700 (+9.7%) | 0.655 (+15%) | 0.644 (+23%) | 0.670 (+38%) |
| Example 14 0.5% | 0.770 (+21%) | 0.744 (+31) | 0.782 (+50%) | 0.674 (+39%) |
| Example 15 1.0% | 0.835 (+31%) | 0.817 (+44%) | 0.846 (+62%) | 0.765 (+57%) |

The results show that the addition of hydrophobic nanoparticles to lactose particles exhibited an increase in packing density.

The data of Table 4A was then divided by BET surface area to take into account the change in surface area.

TABLE 4C

Lactose Water Adsorption/BET Surface Area
(% Change in Water Adsorption/BET Surface Area)

| Wt-% Hydrophobic 5 nm Nanoparticles | BET Surface Area $m^2/g$ (Change in BET Surface Area) | 95% RH | 53% RH | 17% RH |
|---|---|---|---|---|
| Control - no nanoparticles | 1.909 | 2.658 | 2.534 | 2.578 |
| Example 13 0.10% | 1.803 (−5.6%) | 2.782 (+4.7%) | 2.720 (+6.8%) | 2.795 (+8.4%) |
| Example 14 0.50% | 2.125 (+11.3%) | 2.367 (−11%) | 2.319 (−8.5%) | 2.326 (−9.8%) |
| Example 15 1.00% | 3.077 (+61%) | 1.619 (−40%) | 1.587 (−37%) | 1.633 (−37%) |

The results show that the addition of greater than 0.010%, such as 0.50% and 1.00%, of hydrophobic nanoparticles to lactose exhibited a decrease in water adsorption/BET surface area.

TABLE 5A

Aluminum Weight (g)
(Gross Change in Water Adsorption)

| Wt-% Hydrophobic 5 nm Nanoparticles | 95% RH | 53% RH | 17% RH |
|---|---|---|---|
| Control - no nanoparticles | 0.064 g | 0.043 g | 0.037 g |
| Example 16 0.1% | 0.069 g (+7.8%) | 0.036 g (−16%) | 0.025 g (−32%) |
| Example 17 0.5% | 0.105 g (+64%) | 0.092 g (+114%) | 0.029 g (−22%) |
| Example 18 1.0% | 0.109 g (+70%) | 0.085 g (+98%) | 0.041 g (+11%) |

The data of Table 5A was then divided by BET surface area to take into account the change in surface area.

TABLE 5B

Aluminum Water Adsorption/BET Surface Area
(% Change in Water Adsorption/BET Surface Area)

| Wt-% Hydrophobic 5 nm Nanoparticles | BET Surface Area $m^2/g$ (Change in BET Surface Area) | 95% RH | 53% RH | 17% RH |
|---|---|---|---|---|
| Control - no nanoparticles | 0.354 | 0.181 | 0.122 | 0.105 |
| Example 16 0.10% | 0.377 (+6.5%) | 0.183 +1.1% | 0.096 (−21%) | 0.066 (−37%) |
| Example 17 0.50% | 0.997 (+182%) | 0.105 (−42%) | 0.092 (−25%) | 0.029 (−72%) |
| Example 18 1.00% | 2.121 (+499%) | 0.051 (−72%) | 0.040 (−67%) | 0.019 (−82%) |

The aluminum particles were also evaluated using 20 nm surface treated silica nanoparticles described above.

TABLE 6A

Aluminum Weight (g)
(Gross Change in Water Adsorption)

| Wt-% Hydrophobic 20 nm Nanoparticles | 95% RH | 53% RH | 17% RH |
|---|---|---|---|
| Control - no nanoparticles | 0.08 g | 0.044 g | 0.037 g |
| Example 19 0.1% | 0.075 g (−6.2%) | 0.044 g (0) | 0.039 g (+5.4%) |
| Example 20 0.5% | 0.106 g (+32%) | 0.066 g (+50%) | 0.066 g (+78%) |
| Example 21 1.0% | 0.112 g (+40%) | 0.08 g (+82%) | 0.104 g (+181%) |

The data of Table 6A was then divided by BET surface area to take into account the change in surface area.

TABLE 6B

Aluminum Water Adsorption/BET Surface Area
(% Change in Water Adsorption/BET Surface Area)

| Wt-% Hydrophobic 20 nm Nanoparticles | BET Surface Area $m^2/g$ (Change in BET Surface Area) | 95% RH | 53% RH | 17% RH |
|---|---|---|---|---|
| Control - no nanoparticles | 0.354 | 0.226 | 0.124 | 0.105 |
| Example 19 0.10% | 0.266 (−25%) | 0.282 (+25%) | 0.166 (+34%) | 0.147 (+40%) |
| Example 20 0.50% | 0.623 (+76%) | 0.170 (−25%) | 0.106 (−14.5) | 0.106 (<1%) |
| Example 21 1.00% | 1.297 (+266%) | 0.086 (−62%) | 0.062 (−50%) | 0.080 (−24%) |

The results show that the addition of greater than 0.10%, such as 0.50% and 1.00%, of hydrophobic nanoparticles to lactose exhibited a decrease in water adsorption/BET surface area.

The total energy of powder flow was calculated for various examples. The test results for the addition of 0.5 wt-% of the 5 nm surface modified nanoparticles to talc, lactose and $CaCO_3$ at 18% RH is reported as follows:

| | Total Energy of Powder Flow | |
|---|---|---|
| | Control | |
| $CaCO_3$ | 224 | 488 (Example 4) (+118%) |

-continued

| Total Energy of Powder Flow | | |
|---|---|---|
| | Control | |
| Lactose | 74.7 | 61.9 (Example 14) (−17%) |
| Talc (CM-111) | 137 | 50.3 (Example 11) (−63%) |

In general, as the water adsorption/BET surface area decreases, the total energy to powder flow also decreases.

TABLE 7A

Silicon Carbide Weight (g) (Gross Change in Water Adsorption)

| Wt-% Hydrophobic 5 nm Nanoparticles | 95% RH | 53% RH | 17% RH | Wt-% Fumed Silica (TS-530) | 95% RH | 53% RH | 17% RH |
|---|---|---|---|---|---|---|---|
| Control - no nanoparticles | 0.059 | 0.022 | 0.014 | Control - no fumed silica | 0.059 | 0.022 | 0.014 |
| Example 22 0.1% | 0.062 (+5%) | 0.039 (+77%) | 0.016 (+14%) | Example 25 0.1% | 0.059 (0) | 0.041 (+86%) | 0.000 (0) |
| Example 23 0.5% | 0.068 (+93) | 0.063 (+186%) | 0.025 (+79%) | Example 26 0.5% | 0.089 (+51%) | 0.069 (+214%) | 0.029 (+107%) |
| Example 24 1.0% | 0.064 (+84%) | 0.069 (+214%) | 0.032 (+129) | Example 27 1.0% | 0.118 (+100%) | 0.113 (+414%) | 0.034 (+966%) |

The results show that the addition of hydrophobic nanoparticles and fumed silica to the silicon carbide particles did not decrease the gross water adsorption.

The data of Table 7A was then divided by BET surface area to take into account the change in surface area.

Silicon Carbide Weight (g) (% Change in Water Adsorption/BET Surface Area)

| | BET Surface Area m²/g (Change in BET Surface Area) | 95% RH | 53% RH | 17% RH |
|---|---|---|---|---|
| Wt-% Hydrophobic 5 nm Nanoparticles | | | | |
| Control - no nanoparticles | 1.2628 | 0.046 | 0.017 | 0.011 |
| Example 22 0.10% | 1.3160 (+4.2%) | 0.047 (+2.2%) | 0.030 (+76%) | 0.012 (+9%) |
| Example 23 0.50% | 2.3723 (+88) | 0.028 (−39%) | 0.027 (+59%) | 0.011 (0) |
| Example 24 1.00% | 3.6737 (+191%) | 0.017 (−63%) | 0.019 (+12%) | 0.009 (−18%) |
| Wt-% Fumed Silica (TS-530) | | | | |
| Control - no nanoparticles | 1.2628 | 0.046 | 0.017 | 0.011 |
| Example 25 0.1% | 1.2834 (+1.6%) | 0.046 (0) | 0.032 (+88%) | 0.000 (0) |
| Example 26 0.5% | 2.1633 (+72) | 0.041 (−11%) | 0.032 (+88%) | 0.013 (+18%) |
| Example 27 1.0% | 3.2934 (1.61%) | 0.036 (−22%) | 0.034 (+80%) | 0.010 (−9.1%) |

The results show that the hydrophobic nanoparticles can decrease the water adsorption/BET surface area to a greater magnitude relative to an equal mass of fumed silica.

What is claimed is:

1. A method of inhibiting water vapor adsorption of a powder comprising:
   providing a plurality of particles;
   adding discrete hydrophobic surface modified nanoparticles;
   exposing the particles to a relative humidity of least 15%;
   wherein the plurality of particles combined with the hydrophobic surface modified nanoparticles have a lower water vapor adsorption than the plurality of particles alone; and
   exposing the plurality of particles combined with the hydrophobic surface modified nanoparticles to a relative humidity of least 15%, wherein when a liquid is present, the liquid is a volatile inert liquid that is not a solvent with respect to the particles.

2. The method of claim 1 wherein the particles are exposed a relative humidity of at least 25%.

3. The method of claim 1 wherein the particles are exposed to a relative humidity of at least 50%.

4. The method of claim 1 wherein the particles are exposed to a relative humidity of at least 75%.

5. The method of claim 1 wherein the particles combined with the nanoparticles have a lower total energy of powder flow than the particles alone.

6. The method of claim 1 wherein the particles combined with the nanoparticles have a reduction in water adsorption of at least 25%.

7. The method of claim 1 wherein the nanoparticle comprise a metal oxide having a hydrophobic surface treatment.

8. The method of claim 1 wherein the particles comprise metal or a metal oxide.

9. The method of claim 1 wherein the particles comprise an excipient.

10. The method of claim 1 wherein the nanoparticles are present in an amount up to 2 wt-%.

11. The method of claim 1 wherein the particles have a median particle size of less than 100 microns.

12. The method of claim 1 wherein the particles have a median particle size of less than 75 microns.

13. The method of claim 1 wherein the nanoparticles have a primary particle size of less than 100 nanometers.

14. The method of claim 1 wherein the particles have a median primary particle size 100 to 10,000 times larger than the mean particle size of the nanoparticles.

15. The method of claim 1 wherein the nanoparticles comprise silica having an organosilane surface treatment.

16. A method of inhibiting water vapor adsorption of a powder comprising:
   providing a plurality of particles;
   adding discrete hydrophobic nanoparticles;
   exposing the plurality of particles combined with the hydrophobic nanoparticles to a relative humidity of least 15%, wherein when a liquid is present, the liquid is a volatile inert liquid that is not a solvent with respect to the particles.

17. The method of claim 16 wherein the nanoparticles comprise a metal oxide having a hydrophobic surface treatment.

18. The method of claim 16 wherein the particles have a median particle size of less than 100 microns.

19. The method of claim 16 wherein the particles have a median particle size of less than 75 microns.

20. The method of claim 16 wherein the plurality of particles combined with the hydrophobic surface modified nanoparticles are exposed to a relative humidity of at least 15% for at least six days.

* * * * *

UNITED STATES PATENT AND TRADEMARK OFFICE
CERTIFICATE OF CORRECTION

| | |
|---|---|
| PATENT NO. | : 8,834,618 B2 |
| APPLICATION NO. | : 13/504500 |
| DATED | : September 16, 2014 |
| INVENTOR(S) | : Jimmie Baran |

It is certified that error appears in the above-identified patent and that said Letters Patent is hereby corrected as shown below:

In the Specification

Column 1
Line 36, delete "least" and insert -- at least --, therefor.

Column 2
Lines 9-10, delete "miscroscopy" and insert -- microscopy --, therefor.

Line 42, after "or" insert -- 25 --.

Column 3
Line 38, delete "Napervillle," and insert -- Naperville, --, therefor.

Column 4
Lines 37-38, delete "acyrloxyalkyldialkylalkoxysilanes" and insert
-- acryloxyalkyldialkylalkoxysilanes --, therefor.

Lines 63-64, delete "cyclopenyl," and insert -- cyclopentyl, --, therefor.

Column 5
Line 44, delete "dependant" and insert -- dependent --, therefor.

Column 6
Line 9, delete "exfolients," and insert -- exfoliants, --, therefor.

Line 54, delete "isoinoline," and insert -- isoindoline, --, therefor.

Column 8
Line 22, delete "spheriodized" and insert -- spheroidized --, therefor.

Signed and Sealed this
Second Day of June, 2015

Michelle K. Lee
*Director of the United States Patent and Trademark Office*

Column 9
Line 2, delete "magnesuim" and insert -- magnesium --, therefor.

Line 6, delete "therm/hygrometer" and insert -- thermo/hygrometer --, therefor.

Line 29 (approx.), delete "22-guage" and insert -- 22-gauge --, therefor.

Line 45 (approx.), delete "Emmet" and insert -- Emmett --, therefor.

In the Claims

Column 16
Line 8 (approx.), in Claim 1, delete "least" and insert -- at least --, therefor.

Line 33 (approx.), in Claim 1, delete "least" and insert -- at least --, therefor.

Column 17
Line 6, in Claim 16, delete "least" and insert -- at least --, therefor.